(12) United States Patent
Tabata

(10) Patent No.: US 6,858,837 B2
(45) Date of Patent: *Feb. 22, 2005

(54) ILLUMINATING UNIT HAVING DIFFUSION MEANS

(75) Inventor: Masami Tabata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/259,475

(22) Filed: Sep. 30, 2002

(65) Prior Publication Data

US 2003/0025066 A1 Feb. 6, 2003

Related U.S. Application Data

(62) Division of application No. 09/414,557, filed on Oct. 8, 1999, now Pat. No. 6,479,812, which is a division of application No. 08/773,891, filed on Dec. 27, 1996, now Pat. No. 5,986,253.

(30) Foreign Application Priority Data

Jan. 5, 1996 (JP) .................................................. 8-279

(51) Int. Cl.$^7$ ............................................... H01J 40/14
(52) U.S. Cl. ...................................... 250/239; 250/216
(58) Field of Search ............................. 250/239, 208.1, 250/216, 234, 235; 362/16, 217, 222; 358/474, 486

(56) References Cited

U.S. PATENT DOCUMENTS 3,732,430 A  *  5/1973  Hujer et al. ........... 250/559.42
5,079,635 A       1/1992  Koshiyouji et al. ......... 250/238
5,570,202 A      10/1996  Kumashiro ................. 250/239
5,696,607 A      12/1997  Yamana et al. ............. 358/474
5,965,870 A      10/1999  Tabata ..................... 250/208.1
6,002,494 A      12/1999  Tabata ........................ 358/475
6,081,351 A       6/2000  Tabata ........................ 358/475

FOREIGN PATENT DOCUMENTS

| JP | 5-130329 | 5/1993 |
| JP | 6-3528 | 1/1994 |
| JP | 6-22086 | 1/1994 |
| JP | 6-148435 | 5/1994 |
| JP | 6-276355 | 9/1994 |
| JP | 8-163320 | 6/1996 |
| JP | 8-172512 | 7/1996 |

* cited by examiner

*Primary Examiner*—Que T. Le
(74) *Attorney, Agent, or Firm*—Fitzpatrick, Cella, Harper & Scinto

(57) ABSTRACT

There is disclosed an image reading apparatus constructed by an illuminating unit for illuminating an object in a line shape, an image forming optical system for forming a light, as an image, from the object illuminated by the illuminating unit, a line sensor for converting the light formed as an image by the image forming optical system into an image signal, and a frame for holding the illuminating unit and the line sensor, wherein a shape in which vertices of at least a part of the cross section of the illuminating unit are connected by straight lines is set to a polygon of a pentagon or more, so that an image can be stably read at a high quality.

10 Claims, 6 Drawing Sheets

ILLUMINATING UNIT HAVING DIFFUSION MEANS

CROSS REFERENCE TO RELATED APPLICATION

This application is a division of application Ser. No. 09/414,557, filed Oct. 8, 1999, now U.S. Pat. No. 6,479,812, which in turn is a division of application Ser. No. 08/773,891, filed Dec. 27, 1996, now U.S. Pat. No. 5,986,253.

BACKGROUND OF THE INVENTION

1. Field of the Invention

The invention relates to an image reading apparatus for reading an object image and outputting an image signal.

2. Related Background Art

Hitherto, as shown in a cross sectional view of FIG. 11, an image sensor which is in contact with an original to be read and reads an image is constructed by: an image sensor board 2 on which a sensor IC 1 is installed; a lens array 3 for guiding a reflected light from the original illuminated by an illuminating unit 4 to the sensor IC 1; a cover glass 5 which is come into contact with the original; and a frame 6 for positioning and holding those component elements.

As an illuminating unit 4, a unit as shown in a cross sectional view and a top view of FIG. 12 is used. The illuminating unit 4 is constructed by: LEDs 7 of a lead frame type serving as light sources provided on both ends; an optical guide member 8 arranged in a longitudinal direction for converting a light irradiated from the LEDs into a line-shaped light; and a housing 9 having a square cross sectional shape for positioning and holding the LEDs 7 and optical guide member 8. An electric power is supplied to the LED 7 from a power source (not shown) through a lead 11.

When such an illuminating unit 4 is attached to the frame, as shown in FIG. 11, in order to illuminate the light from the oblique direction of 45° for the original, an attaching surface which is inclined by 45° for the original mounting surface is provided for the frame 6, and the surface corresponding to one side of a square in the cross section of the housing 9 constructing the illuminating unit 4 is come into contact with the inclined attaching surface and is adhered by both-side adhesive tape or the like, thereby positioning and fixing.

However, in the conventional image sensor mentioned above, since the housing of the illuminating unit having the square cross section is installed to the frame so as to be inclined by 45° for the original surface, there are the following problems.

(1) To enclose the illuminating unit into the frame, it is necessary that a length of diagonal line in the cross section of the housing of the illuminating unit is assured in the vertical direction in the frame. However, the image sensor main body cannot be largely formed. Therefore, a thickness of frame with which the lower portion of the illuminating unit is come into contact has to be made thin. It is difficult to work the frame. Even if the frame can be worked, a mechanical strength of the frame is insufficient.

(2) An angle at which the illuminating unit is attached to the frame is not equal to 45° depending on an individual difference of each image sensor and an optical axis is deviated, so that there is a case where an illuminance on the original reading line doesn't reach a specified value.

(3) To fix the illuminating unit to the frame, not only a material such as both-side adhesive tape or adhesive agent is necessary but also a step of attaching such a material is added, so that manufacturing costs rise.

SUMMARY OF THE INVENTION

It is an object of the invention to enable an image to be read at a high quality.

Another object of the invention is to provide an image reading apparatus of a high mechanical strength.

Still another object of the invention is to miniaturize an image reading apparatus.

Further another object of the invention is to suppress a variation in reading lines due to a deviation of an optical axis.

To accomplish the above objects, according to an embodiment of the invention, there is provided an image reading apparatus comprising: illuminating means for illuminating an object in a line shape; image forming optical system for forming a light, as an image, from an object illuminated by the illuminating means; a line sensor for converting the light formed as an image by the image forming optical system into an image signal; and holding means for holding the illuminating means and the line sensor, wherein a shape formed by connecting vertices in at least a part of a cross section of the illuminating means by straight lines is set to a polygon of a pentagon or more.

According to another embodiment, there is provided an image reading apparatus comprising: illuminating means which is constructed by a point light source and optical guide means for guiding and converting a light from the point light source into a line-shaped light and illuminate an object in a line shape; an image forming optical system for forming the light, as an image, from the object illuminated by the illuminating means; a line sensor for converting the light formed as an image by the image forming optical system into an image signal; and holding means for holding the illuminating means and the line sensor, wherein at least a part of a cross section of the illuminating means has a circular shape.

According to still another embodiment, there is provided an image reading apparatus comprising: illuminating means for illuminating an object in a line shape; an image forming optical system for forming the light, as an image, from the object illuminated by the illuminating means; a line sensor for converting the light formed as an image by the image forming optical system into an image signal; and holding means for holding the illuminating means and the line sensor, wherein at least a part of the cross sectional shape of the illuminating means has a circular shape and a convex portion is formed on the outer periphery of the circular shape and is come into engagement with a concave portion formed in the holding means, thereby certainly positioning.

According to further another embodiment, there is provided an image reading apparatus comprising: illuminating means for illuminating an object in a line shape; an image forming optical system for forming a light, as an image, from an object illuminated by the illuminating means; a line sensor for converting the light formed as an image by the image forming optical system into an image signal; and holding means for holding the illuminating means and the line sensor, wherein at least a part of the cross sectional shape of the illuminating means has a circular shape and a concave portion is formed on the outer periphery of the circular shape and is come into engagement with a convex portion formed in the holding means, thereby certainly positioning.

With the above construction, a cross sectional area of the illuminating means is small and an enough mechanical strength can be assured while miniaturizing the apparatus.

Further, by certainly positioning the illuminating means, a variation in reading line can be suppressed and an image can be read at a high quality.

The above and other objects and features of the present invention will become apparent from the following detailed description and the appended claims with reference to the accompanying drawings.

DETAILED DESCRIPTION OF THE PREFERRED EMBODIMENTS

Figure 1:
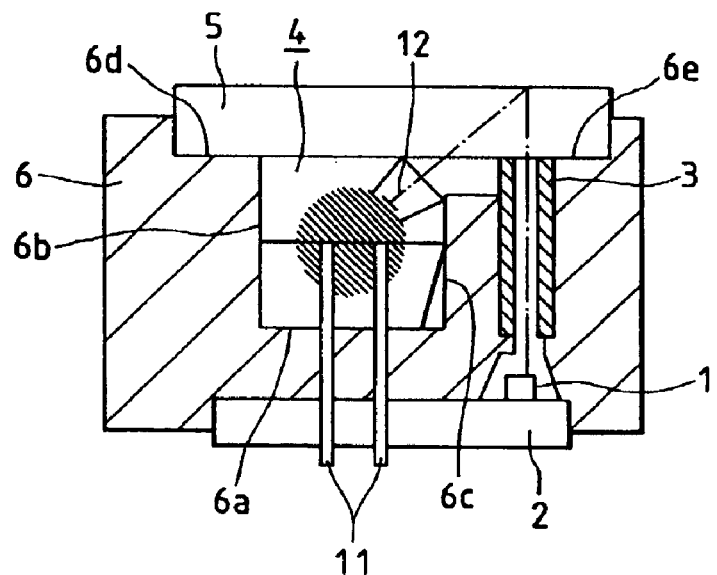
FIG. 1 is a cross sectional view of an image sensor according to the first embodiment.
Figure 2:
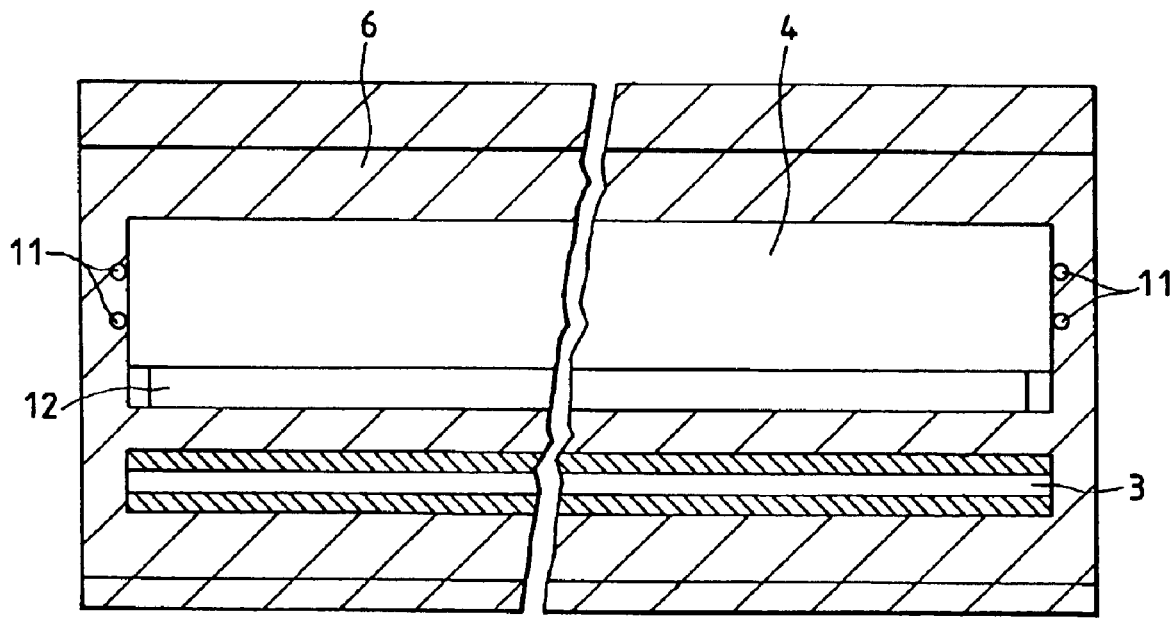
FIG. 2 is a top view of an image sensor of the first embodiment.

The first embodiment of the invention will now be described hereinbelow with reference to FIGS. 1 to 5. FIG. 1 is a cross sectional view of an image reading apparatus and FIG. 2 is a top view thereof.

The image reading apparatus according to the present embodiment is constructed by: the image sensor board 2 in which a plurality of sensor ICs 1 each having a group of line-shaped photoelectric converting elements (line sensors) are accurately arranged on a board made of a glass epoxy material or the like in correspondence to a length of original to be read; the lens array 3 serving as an image forming optical system; the illuminating unit 4 serving as illuminating means; the cover glass 5 serving as supporting means for supporting an original and made of a light transmitting material; and the frame 6 serving as holding means and made of a material of a metal such as aluminum or the like or a resin such as polycarbonate or the like for positioning and holding the above component elements.

The original supported by the cover glass 5 is illuminated by a light from the illuminating unit 4 from the oblique direction at an angle of 45°. The reflected light from the original is formed as an image onto the sensor IC 1 by the lens array 3. The sensor IC 1 converts light information into an electric signal and transmits to a system image processing unit.

Figure 3:
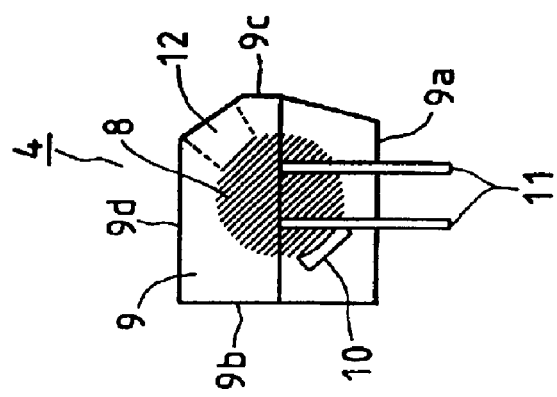
FIG. 3 is a cross sectional view of an illuminating unit of the first embodiment.
Figure 4:
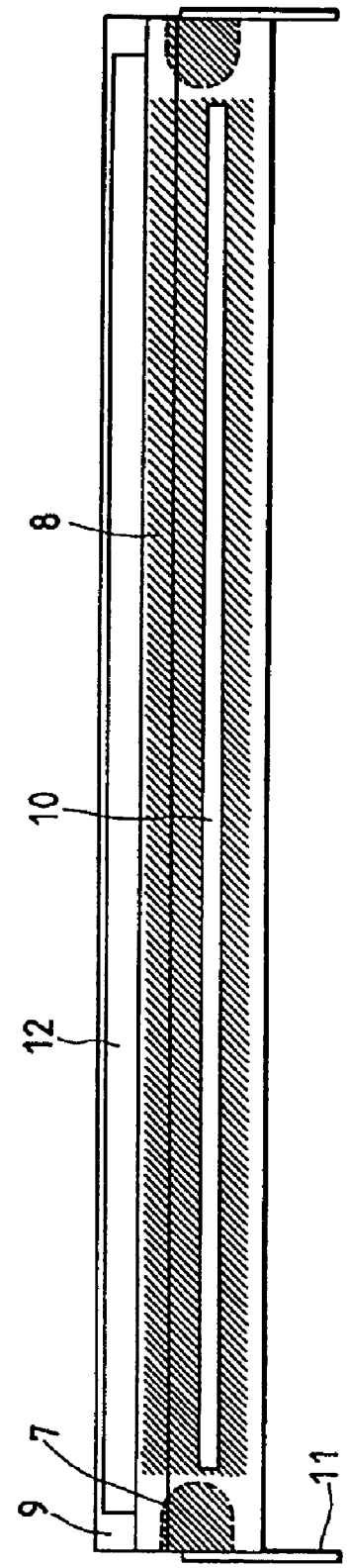
FIG. 4 is a side elevational view of an illuminating unit of the first embodiment.

FIG. 3 is a cross sectional view of the illuminating unit 4 and FIG. 4 is a top view thereof.

As shown in FIGS. 3 and 4, the illuminating unit 4 is constructed by: the LEDs 7 serving as point light sources of the lead frame type provided as light sources at both ends; the optical guide member 8 serving as optical guide means of a cylindrical shape and made of a light transmitting material such as an acrylic resin or the like in order to guide the light of the LED in a line shape in the longitudinal direction; and the housing 9 for positioning and holding the LEDs 7 and the optical guide member 8. In the housing 9, a shape formed by connecting vertices of a cross section by straight lines is a hexagon.

The LEDs 7 are provided on both ends of the optical guide member 8 and the illumination light enters the optical guide member 8. A diffusing surface 10 serving as a diffusing means is provided for the optical guide member 8.

Figure 5:
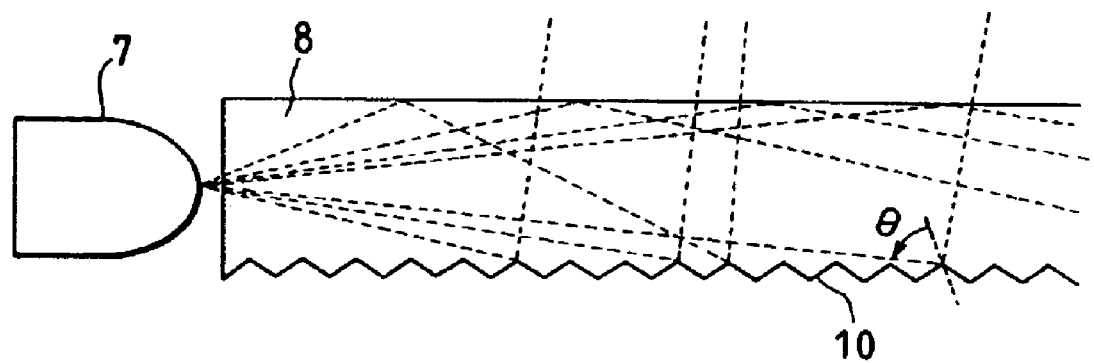
FIG. 5 is a detailed diagram of an optical guide member of the first embodiment.

As shown in an enlarged diagram of FIG. 5, a fine tapered shape of the diffusing surface 10 is continuously formed in the longitudinal direction of the optical guide member 8. The light entering at an angle such that an incident angle $\theta$ to the tapered portion is equal to or larger than 41° (in the case where the optical guide member is made of an acrylic resin and a refractive index n=1.5) satisfies the total reflection conditions and is emitted in a desired direction.

The housing 9 for positioning and holding the LEDs 7 and the optical guide member 8 has a slit 12 for transmitting the light to one side in the direction where the light of the hexagonal cross section is emitted. In order to gain a light amount, the outside of the optical guide member has a white surface with a good light reflecting efficiency and is made of a material such as an ABS resin or the like.

A method of manufacturing the image sensor will now be described.

The lens array 3 and illuminating unit 4 are inserted to predetermined positions of the frame 6, respectively. In the illuminating unit 4, three sides 9a, 9b, and 9c of the hexagon of the housing 9 shown in FIG. 3 are respectively come into contact with a horizontal positioning surface 6a and vertical positioning surfaces 6b and 6c of the frame 6 shown in FIG. 1, thereby enabling the light source to be accurately positioned in the illuminating direction.

The cover glass 5 is adhered by an adhesive agent or the like onto two surfaces 6d and 6e in the longitudinal direction of the frame 6 set so as to sandwich the illuminating unit 4 and lens array 3 on a plane that is approximately the same as a top surface 9d of the housing 9 of the illuminating unit 4 inserted into the frame 6 and a top surface of the lens array 3.

The top surface 9d of the housing 9 of the illuminating unit 4 is a horizontal surface and is in contact with the surface of the cover glass 5 approximately in parallel, by adhering the frame 6 and cover glass 5, they can be fixed together with the illuminating unit 4. By inserting the sensor array 2 into the frame 6 and fixing with an adhesive agent or the like, the apparatus is completed.

According to the embodiment as described above, since the shape in which the vertices of the cross section of the housing of the illuminating unit are connected by straight lines is a hexagon, the cross sectional area of the housing can be reduced and the frame of a thickness with an enough mechanical strength can be assured. Further, since a sitting state of the illuminating unit to the frame is improved, a deviation of the optical axis can be prevented and a variation in illuminances of the original reading lines among the products can be suppressed. By adhering the frame and the cover glass, the illuminating unit can be also simultaneously fixed. The assembling steps can be simplified and the costs can be reduced.

Although the embodiment has been shown and described with respect to the example in the case where the shape in which the vertices of the cross section of the housing of the illuminating unit are connected by straight lines is a hexagon, the invention is not limited to such an example. By setting such a shape to a polygon of a pentagon or more, a similar effect can be obtained.

Figure 6:
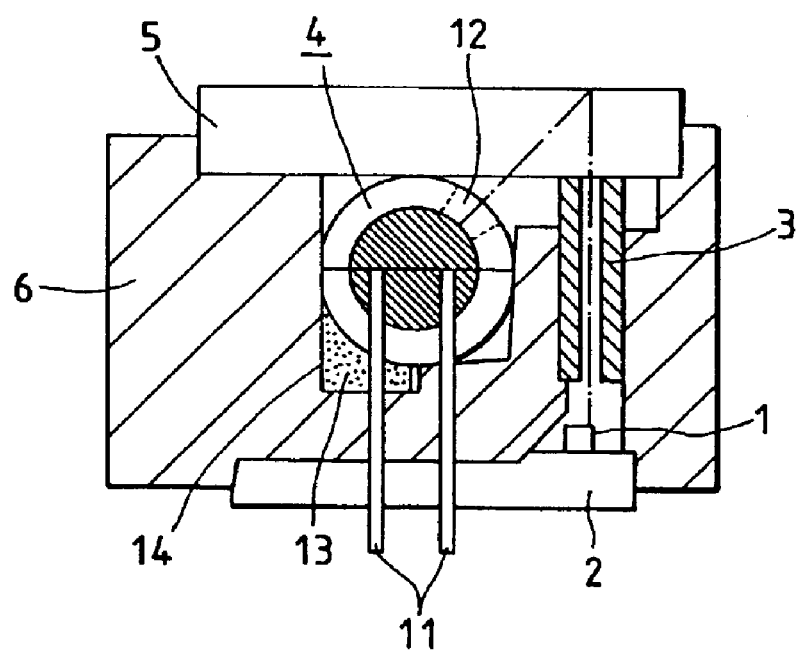
FIG. 6 is a cross sectional view of an image sensor according to the second embodiment.
Figure 7:
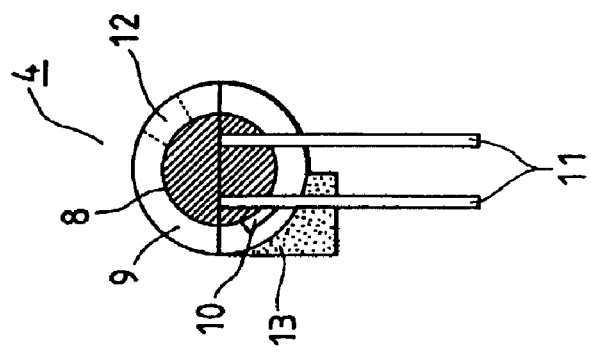
FIG. 7 is a cross sectional view of an illuminating unit of the second embodiment.
Figure 8:
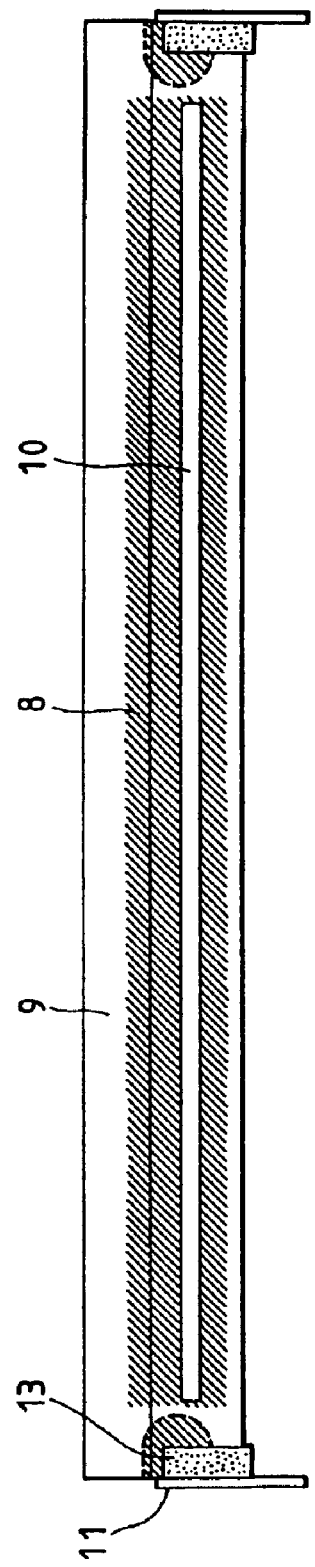
FIG. 8 is a side elevational view of an illuminating unit of the second embodiment.

FIGS. 6, 7, and 8 show an image reading apparatus of the second embodiment. Since a construction of the image reading apparatus of the second embodiment is fundamentally similar to that of the first embodiment, the description of the same portions is omitted here.

The optical guide member 8 in the embodiment has a cylindrical or elliptic cylindrical shape or a shape similar thereto. In order to minimize a volume of illuminating unit 4, it is desirable that a cross sectional shape of the housing 9 has a circular or an elliptic shape or a shape similar thereto in correspondence to the optical guide member 8. On the other hand, when the shape of the housing 9 is set to a simple cylindrical or elliptic cylindrical shape, when it is attached to the frame 6, the position in the optical axial direction is not determined.

Figure 9:
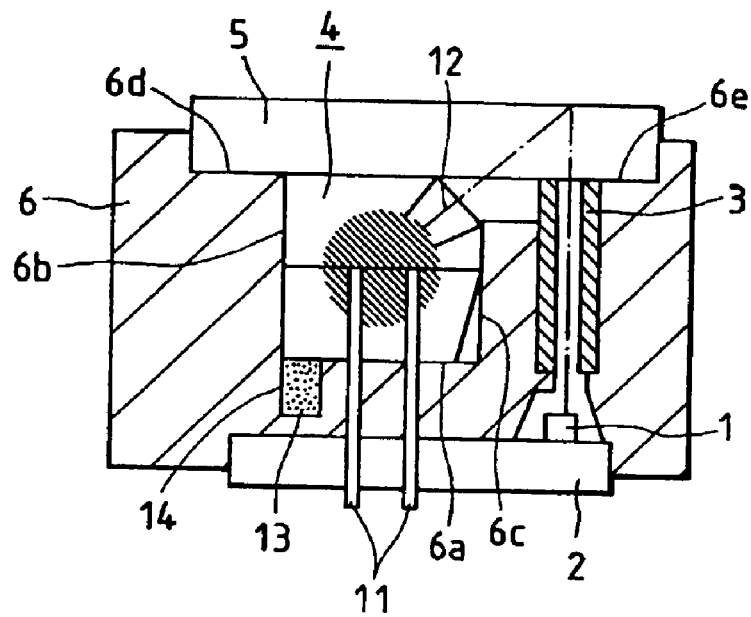
FIG. 9 is a cross sectional view of an image sensor according to the second embodiment.
Figure 10:
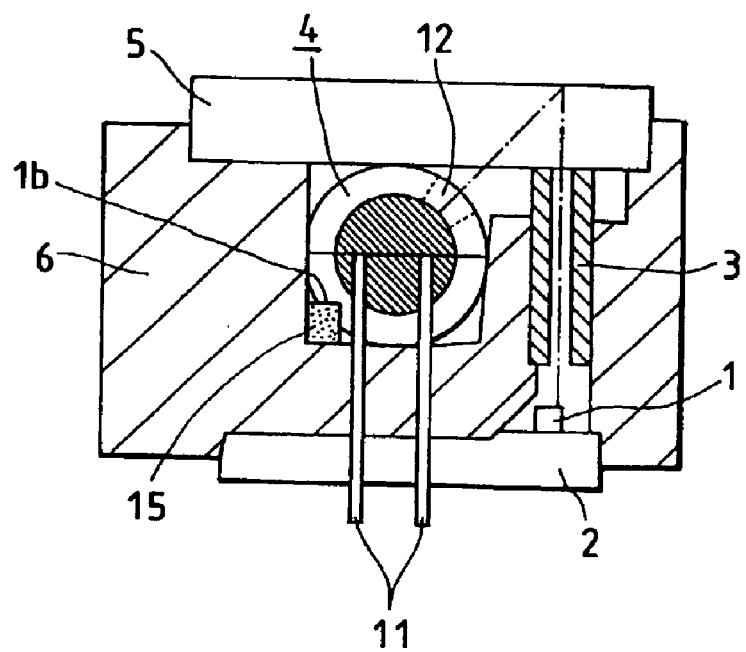
FIG. 10 is a cross sectional view of an image sensor according to the second embodiment.
Figure 11:
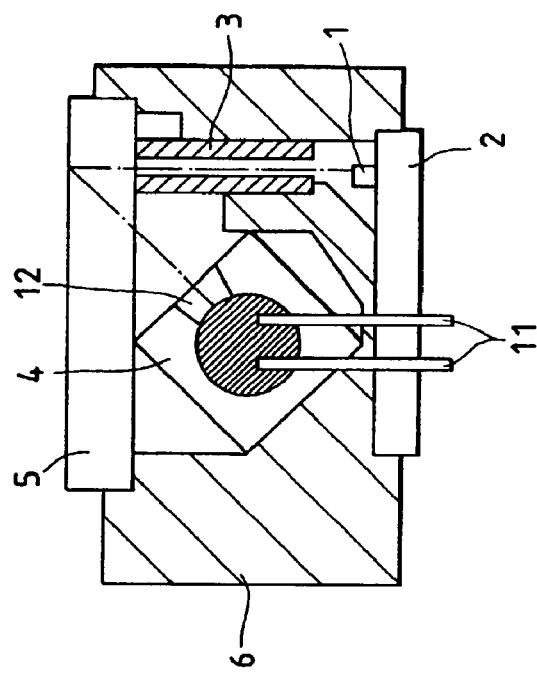
FIG. 11 is a cross sectional view of a conventional image sensor.
Figure 12:
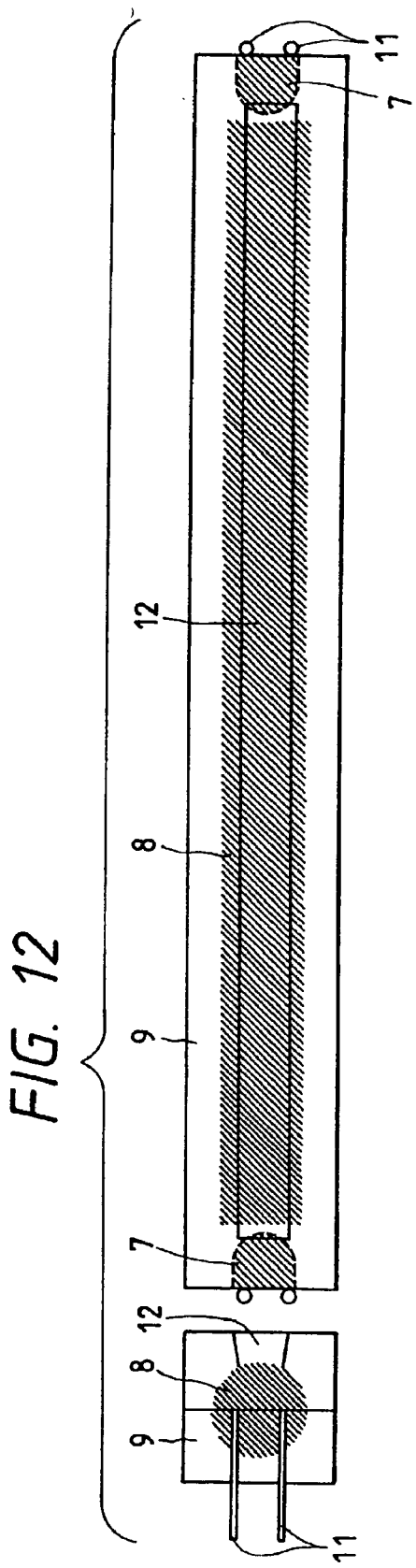
FIG. 12 is a cross sectional view and a top view of a conventional illuminating unit.

In the embodiment, therefore, although the housing 9 has a cylindrical shape, convex portions 13 are formed on both ends of the housing 9. Concave portions 14 are formed in the frame 6 so that the convex portions 13 are fitted into the concave portions 14. By inserting the convex portions 13 into the concave portions 14, the position in the optical axial direction and the position in the longitudinal direction can be simultaneously determined. With respect to the foregoing first embodiment as well, by forming the convex portions 13 in the housing 9 and by inserting the convex portions 13 into the concave portions 14 of the frame 6 as shown in FIG. 9 in a manner similar to the second embodiment, the positioning in the longitudinal direction can be certainly executed. In the embodiment, although the convex portions have been formed in the housing, by forming convex portions 15 in the frame and forming concave portions 16 in the housing as shown in FIG. 10, a similar effect is derived.

Further, although the shape of the equal magnification optical system has been described in the above embodiments, the invention can be also obviously applied to the image sensor using a reduction magnification optical system.

Many widely different embodiments of the present invention may be constructed without departing from the spirit and scope of the present invention. It should be understood that the present invention is not limited to the specific embodiments described in the specification, except as defined in the appended claims.

What is claimed is:

1. An illuminating unit comprising:
    (A) an illumination source adapted to illuminate an object from an oblique direction in a line shape, said illumination source including an LED light source, an elongated light guide adapted to guide light from said LED light source, and a diffuser adapted to irradiate the light beam from a light irradiation surface of said elongated light guide; and
    (B) a housing adapted to hold said illumination source, wherein said illuminating unit has, at an end thereof in a longitudinal direction, a convex portion for connecting with a holder.

2. A unit according to claim 1, wherein said diffuser has a stairway-shaped diffusing surface.

3. A unit according to claim 1, wherein said housing has a slit in an illuminating direction of the light.

4. A unit according to claim 1, wherein said illumination source includes two LED light sources which are arranged at both ends of said elongated light guide, respectively.

5. A unit according to claim 1, wherein said LED light source includes a lead frame.

6. An image reading apparatus comprising:
    (A) an illumination source adapted to illuminate an object from an oblique direction in a line shape, said illumination source including an LED light source, an elongated light guide adapted to guide light from said LED light source, and a diffuser adapted to irradiate the light beam from a light irradiation surface of said elongated light guide;
    (B) a housing adapted to hold said illumination source;
    (C) image sensors adapted to convert light from said object illuminated by said illumination source into image signals, said image sensors are arranged on a sensor board; and
    (D) a holder adapted to hold said housing and said sensor board, wherein said illumination source and said housing are included in an illumination unit, and said illumination unit has, at an end thereof in a longitudinal direction, a convex portion for connecting with said holder.

7. An apparatus according to claim 6, wherein said diffuser has a stairway-shaped diffusing surface.

8. An apparatus according to claim 6, wherein said housing has a slit in an illuminating direction of the light.

9. An apparatus according to claim 6, wherein said illumination source includes two LED light sources which are arranged at both ends of said elongated light guide, respectively.

10. An apparatus according to claim 6, wherein said LED light source includes a lead frame.

* * * * *